US005319786A

United States Patent [19]
Yamamura

[11] Patent Number: 5,319,786
[45] Date of Patent: Jun. 7, 1994

[54] APPARATUS FOR CONTROLLING A SCANNING TYPE VIDEO DISPLAY TO BE DIVIDED INTO PLURAL DISPLAY REGIONS

[75] Inventor: Kimio Yamamura, Tokyo, Japan

[73] Assignee: Hudson Soft Co., Ltd., Hokkaido, Japan

[21] Appl. No.: 563,745

[22] Filed: Aug. 3, 1990

Related U.S. Application Data

[63] Continuation of Ser. No. 196,335, May 18, 1988, abandoned.

[30] Foreign Application Priority Data

| | | | |
|---|---|---|---|
| May 20, 1987 | [JP] | Japan | 62-123048 |
| May 20, 1987 | [JP] | Japan | 62-123051 |
| Sep. 19, 1987 | [JP] | Japan | 63-235484 |
| Sep. 19, 1987 | [JP] | Japan | 62-235485 |
| Sep. 19, 1987 | [JP] | Japan | 62-235486 |

[51] Int. Cl.[5] .......... G06F 15/66
[52] U.S. Cl. .......... 395/800; 364/237.82; 364/237.2; 364/247; 364/259.3; 364/DIG. 1; 395/166
[58] Field of Search .......... 395/100, 164, 165, 166, 395/800

[56] References Cited

U.S. PATENT DOCUMENTS

| | | | |
|---|---|---|---|
| 4,070,710 | 1/1978 | Sukonick et al. | 364/900 |
| 4,093,996 | 6/1978 | Hogan | 340/750 |
| 4,149,264 | 4/1979 | Hamada | 364/200 |
| 4,232,374 | 11/1980 | Chung et al. | 364/900 |
| 4,399,435 | 8/1983 | Urabe | 340/802 |
| 4,471,464 | 9/1984 | Mayer et al. | 364/900 |
| 4,471,465 | 9/1984 | Mayer | 364/900 |
| 4,569,019 | 2/1986 | DiOrio | 364/900 |
| 4,589,089 | 5/1986 | Frederiksen | 364/900 |
| 4,654,804 | 3/1987 | Thaden | 364/200 |
| 4,670,745 | 6/1987 | O'Malley | 340/789 |
| 4,683,534 | 7/1987 | Tietjen | 364/200 |
| 4,757,310 | 7/1988 | Katsara | 340/798 |
| 4,777,621 | 10/1988 | Miner et al. | 364/900 |
| 4,874,164 | 10/1989 | Miner | 237/437 |
| 4,903,217 | 2/1990 | Gupta | 364/521 |
| 4,951,037 | 8/1990 | Yamamura | 340/725 |

*Primary Examiner*—Eric Coleman
*Attorney, Agent, or Firm*—Lowe, Price, LeBlanc & Becker

[57] ABSTRACT

An apparatus for controlling the access of a video memory comprises a group of registers in which various kinds of control data are set to access a video memory. The group of the registers are set to store data for detecting scanning rasters, incrementing or decrementing an address of the video memory which is accessed, and starting a DMA transfer of image data. Therefore, various kinds of accessing modes can be performed without the necessity of a complicated software.

9 Claims, 15 Drawing Sheets

$0 \leqq N < n_1$ $n_1 \leqq N < n_2$ $n_2 \leqq N < n_3$

APPARATUS FOR CONTROLLING A SCANNING TYPE VIDEO DISPLAY TO BE DIVIDED INTO PLURAL DISPLAY REGIONS

This application is a continuation application of application Ser. No. 07/196,335, filed May 18, 1988, now abandoned.

FIELD OF THE INVENTION

The invention relates to an apparatus for controlling the access of a video memory, and more particularly to an apparatus for controlling the access of a video memory in which various kinds of controlling modes can be performed, while the number of registers is refrained from being increased.

BACKGROUND OF THE INVENTION

In a conventional personal computer, the so-called "television game" etc. are played especially among children. Such a personal computer is provided with an apparatus for displaying an image on a displaying screen which comprises a central processing unit (CPU) for supplying control signals and data which are read from a read only memory (ROM) to selected circuits included therein, a video display controller for defining patterns of a background and a sprite, color codes, displaying positions etc. on a displaying screen in accordance with signals from the CPU, a video color encoder for producing analog RGB signals and video color signals in accordance with signals from the video display controller, and a sound generator for producing sounds in accordance with sound signals supplied from the CPU.

In operation, a background and a sprites are displayed on the displaying screen which is connected to the video color encoder in accordance with a program stored in the ROM, and sounds are radiated from speakers which are connected to the sound generator in accordance with the program so that a story of a television game is developed in the personal computer.

The video display controller normally comprises a predetermined number of registers each storing a raster number at which a displaying screen is divided. On the divided regions of the displaying screen, a plurality of patterns corresponding to different pages are displayed.

In accessing a video memory, an address is increased in accordance with a counted value of an address counter by one to write data thereinto or to read data therefrom. In such a case, if the CPU is eight bits and the video memory is sixteen bits, the data is divided into upper and lower bytes which are transferred separately.

In a direct memory access (DMA), on the other hand, a predetermined block length of data are transferred from a source address of the video memory to a destination address thereof under the control of a DMA controller.

According to the conventional apparatus for displaying an image on a displaying screen, however, there are following disadvantages. A first disadvantage is that a construction of the apparatus is complicated and a cost of manufacturing the same is high for the reason why a predetermined number of registers must be provided therein to divide the displaying screen.

A second disadvantage is that an image is processed only in a single pattern thereby providing less interest in the display thereof because an address is increased by one regularly. In a case where a special processing of an image is required in a television game to give an increased interest for a player, this can not be performed in accordance with a method of a video memory access because the method of accessing the video memory is fixed as described above.

A third disadvantage is that a processing amount and time of the CPU are increased in addressing the video memory and so on because data of sixteen bits are divided into upper and lower bytes to be transferred through 8/16 bit data bus interface between the CPU of eight bits and the video memory of sixteen bits.

A fourth disadvantage is that a signal for the trigger of a DMA transfer which is advantageous in a transfer speed as compared to a CPU transfer must be set beforehand.

A fifth disadvantage is that a data bus width of a circuit included in the apparatus must be set to be a predetermined width so as to comply with that of the CPU, and a matching of an interface therebetween must be adjusted in a case where data bus widths of the CPU and the remaining circuits are different from each other.

SUMMARY OF THE INVENTION

Accordingly, it is an object of the invention to provide an apparatus for controlling the access of a video memory in which a single register is provided to divide the displaying screen into a plurality of regions.

It is another object of the invention to provide an apparatus for controlling the access of a video memory in which an image is processed in a plurality of patterns by changing a method of accessing the video memory.

It is a further object of the invention to provide an apparatus for controlling the access of a video memory in which a processing amount and time of a CPU is refrained from being increased even if data of sixteen bits are divided into upper and lower bytes to be transferred between the CPU of eight bits and a video memory of sixteen bits.

It is a still further object of the invention to provide an apparatus for controlling the access of a video memory in which a signal for the trigger of a DMA transfer is not necessary to be set beforehand to conduct the DMA transfer.

It is a yet still further object of the invention to provide an apparatus for controlling the access of a video memory in which the change of a data bus width can be made only by use of a control signal.

According to the invention, an apparatus for controlling the access of a video memory comprises, a video memory in which image data are stored, a group of registers in which control data for accessing said video memory are set, and means for controlling the access of said image data in accordance with said control data.

BRIEF DESCRIPTION OF THE DRAWINGS

The invention will be explained in detail in conjunction with drawings wherein.

DESCRIPTION OF PREFERRED EMBODIMENTS

Figure 1:
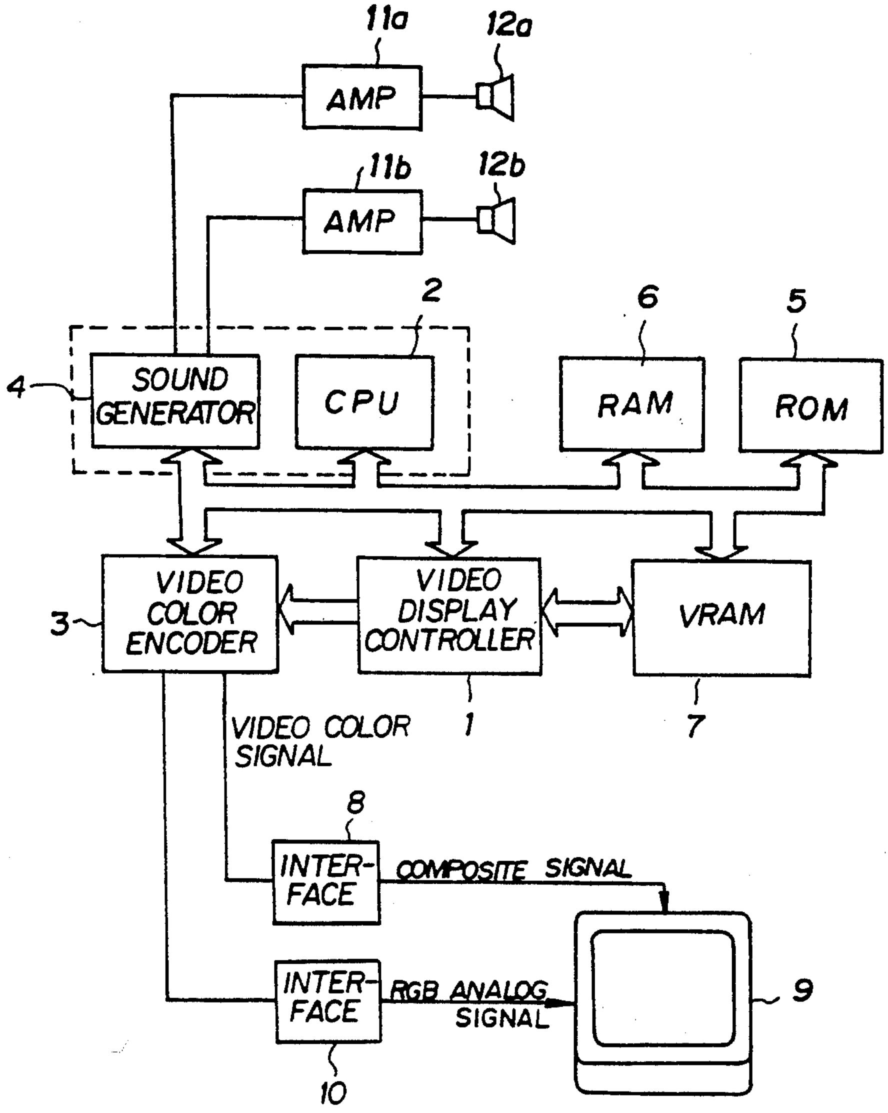
FIG. 1 is a block diagram showing an apparatus for displaying an image on a screen in which an apparatus for controlling the access of a video memory according to the invention is included.

In FIG. 1, there is shown an apparatus for displaying an image on a screen which is mainly composed of a video display controller 1, a CPU 2, a video color encoder 3, and a programable sound generator 4. The video display controller 1 supplies the video color encoder 3 with image data for a story which are read from a VRAM 7 under the control of the CPU 2 reading a program stored in a ROM 5. The CPU 2 controls a RAM 6 to store data, calculation or arithmetical results etc. temporarily in accordance with a program stored in the ROM 5. The video color encoder 3 is supplied with image data to produce RGB analog signals or video color signals including luminance signals and color difference signals to which the RGB signals are matrix-converted by using color data stored therein. The programable sound generator 4 is controlled by the CPU 2 reading a program stored in the ROM 5 to produce audio signals making left and right stereo sounds. The video color signals produced at the video color encoder 3 are of composite signals supplied through an interface 8 to a television set 9, while the RGB analog signals are directly supplied to a CRT of the television set 9 which is used as an exclusive monitor apparatus. The left and right analog signals supplied from the programable sound generator 4 are amplified at amplifiers 11*a* and 11*b* to make sounds at speakers 12*a* and 12*b*.

Figure 2A:
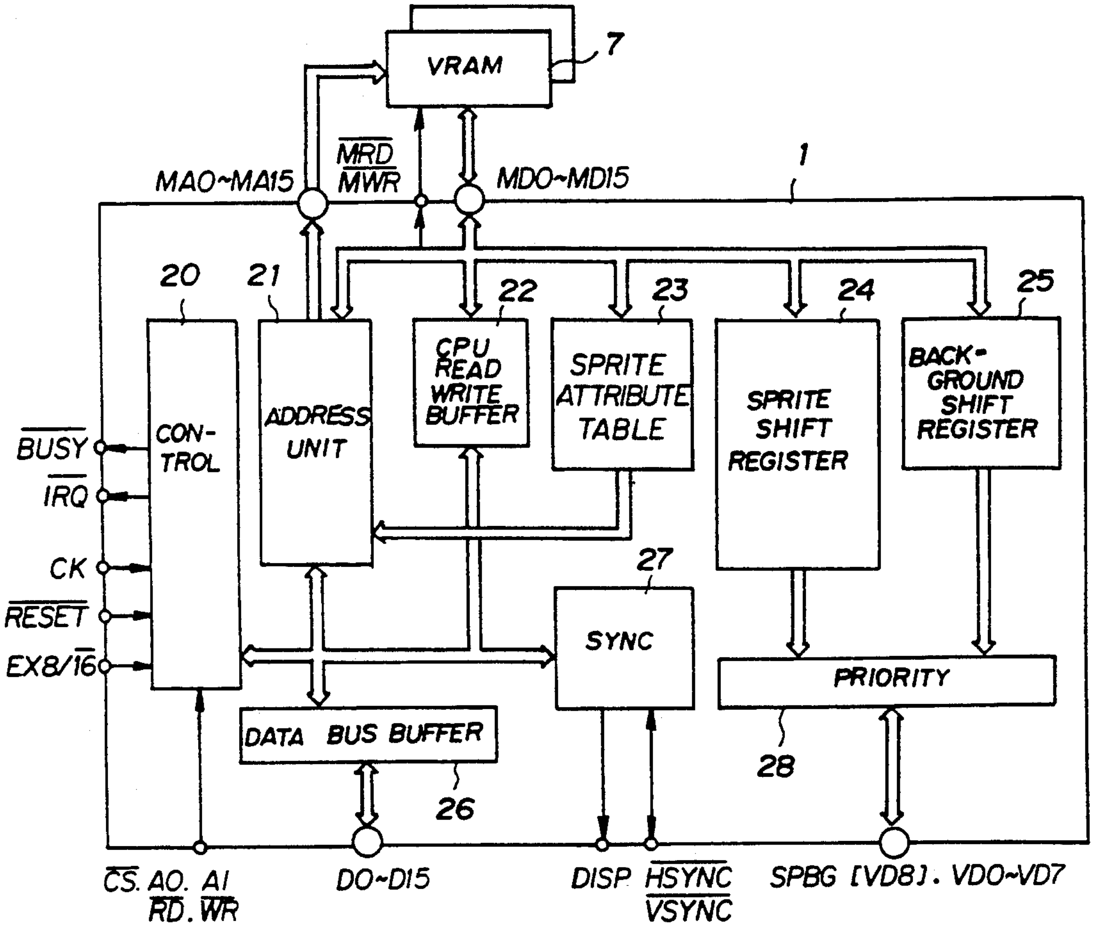
FIG. 2A is a block diagram showing a video display controller for the control of writing video signals into a VRAM and reading video signals therefrom.

In FIG. 2A, there is shown the video display controller 1 transferring data between the CPU 2 and VRAM 7 which comprises a control unit 20 including various kinds of registers to be described later, an address unit 21, a CPU read/write buffer 22, and sprite shift register 24, a background shift register 25, a data bus buffer 26, a synchronic circuit 27, and a priority circuit 28.

The control unit 20 is provided with a $\overline{\text{BUSY}}$ terminal being "L" to keep the CPU 2 writing data into the VRAM 7 or reading data therefrom in a case where the video display controller 1 is not in time for the writing or reading of the date, an $\overline{\text{IRQ}}$ terminal supplying an interruption request signal, a CK terminal receiving a clock signal of a frequency for one dot (one picture element), a $\overline{\text{RESET}}$ terminal receiving a reset signal for initializing the video display controller 1, and an EX 8/$\overline{16}$ terminal receiving a data bus width signal for selecting one of 8 and 16 bit data buses.

The address unit 21 is connected to terminals MA0 to MA15 supplying address signals for the VRAM 7 which has, for instance, a special address region of 65,536 words. The address unit 21, CPU read/write buffer 22, sprite attribute table 23, sprite shift register 24, and background shift register 25 are connected to terminals MD0 to MD15 through which data are trnasferred to and from the VRAM 7.

The sprite attribute table buffer 23 is a memory for storing X and Y display positions, pattern codes and control data of sprites each composed of 16×16 dots as described in more detail later.

The sprite shift register 24 stores pattern and color data of a sprite read from a sprite generator in the VRAM 7 which is accessed in accordance with the pattern codes stored in the sprite attribute table 23 as described in more detail later.

The background shift register 25 stores pattern data, along with CG color, read from a character generator in the VRAM 7 in accordance with an address based on a character code of a background attribute table in the VRAM 7 which is accessed in an address decided by a raster position as also described in more detail later.

The data bus buffer 26 is connected to terminals D0 to D15 through which data are supplied and received. In the video display controller 1, 8 or 16 bit interface is selected to comply with a data width of a system including the CPU2 wherein the terminals D0 to D7 among the terminals D0 to D15 are occupied when the 8 bit interface is selected.

The synchronic circuit 27 is connected to a DISP terminal indicating a display period, a $\overline{\text{VSYNC}}$ terminal from which a vertical synchronous signal for a CRT screen is supplied and in which an external vertical synchronous signal is received, and a $\overline{\text{HSYNC}}$ terminal from which a horizontal synchronous signal for a CRT screen is supplied and in which an external horizontal synchronous signal is received.

The priority circuit 28 is connected to terminals VD0 to VD7 through which video signals are supplied, and a SPBG (VD8) terminal being "H" when the video signals are of a sprite and being "L" when the video signals are of a background.

The aforementioned control unit 20 is also connected to a $\overline{\text{CS}}$ terminal being "L" wherein the CPU 2 is able to read data from registers therein and sprite data thereinto, a $\overline{\text{RD}}$ terminal receiving a clock signal for the reading thereof, a $\overline{\text{WR}}$ terminal receiving a clock signal for the writing thereof, and terminals A0 and A1 which are connected to address bus of the CPU 2. Further, the video display controller 1 is provided with a $\overline{\text{MRD}}$ terminal being "L" when the CPU 2 reads data from the VRAM 7, and a $\overline{\text{MWR}}$ terminal being "L" when the CPU 2 writes data into the VRAM 7.

Figure 2B:
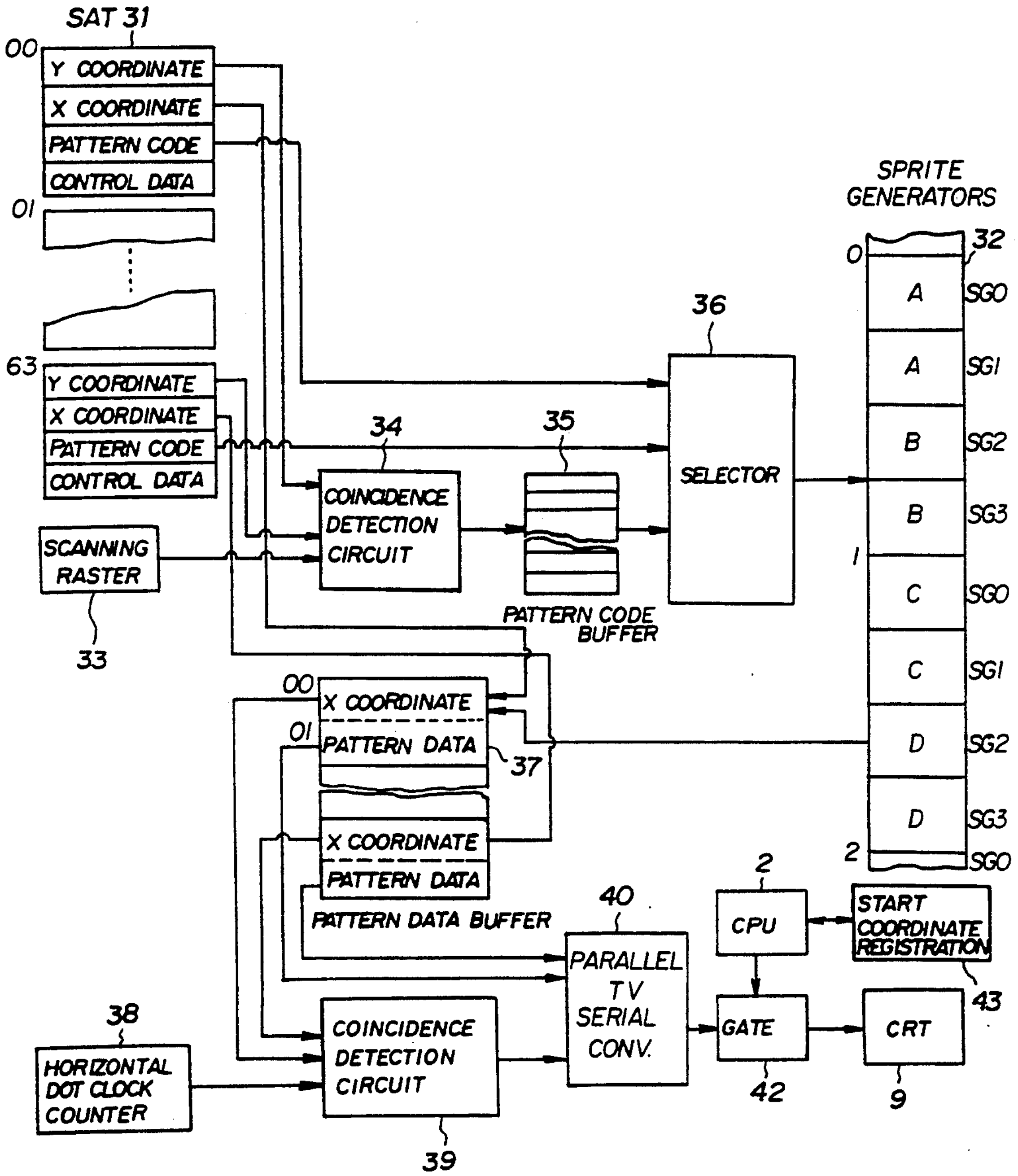
FIG. 2B is a block diagram showing an apparatus for displaying a sprite on a screen.

In FIG. 2B, there is shown an apparatus for displaying a sprite on a screen wherein the reference numerals 31 and 32 indicate a sprite attribute table and sprite generator in the VRAM 7 respectively. The sprite attribute table 31 can include, for instance, sixty four sprites, while the sprite generator 32 can include, for instance, one thousand and twenty-four sprites. In the sprite attribute table 31, addresses of 0 to 63 are assigned to the sixty-four sprites to give a priority thereto in the order of the address 0>1>----- >62>63. Each of the sprites is composed of 16×16 bits, and includes X and Y coordinates, pattern codes and control data. As to each of the sprites, the Y coordinate is compared with a raster signal supplied from a scanning raster producing circuit 33 in a coincidence detection circuit 34 whereby sprites each having a Y coordinate coincident with a raster signal are stored into a pattern code buffer 35 which can store a maximum number of sixteen sprites by referring to a corresponding one of the addresses 0 to 63. A selector 36 selects a pattern code of the sprite attribute table 31 in accordance with an address stored in the pattern code buffer 35 to access the sprite generator 32 in regard to an address which is of a selected pattern code, thereby reading pattern data from the sprite generator 32. The pattern data thus obtained are stored into a pattern data buffer 37 along with an X coordinate corresponding thereto read from the sprite attribute table 31. The storing of sprites into the pattern code buffer 35 is performed at a horizontal display period preceding to the present horizontal display period by one scanning raster, while the storing of pattern data into the pattern data buffer 37 is performed at a following horizontal retrace period. When a scanning raster at which pattern data are displayed has come, the X coordinate thus stored in the pattern data buffer 37 is compared with a counted value of a horizontal dot clock counter 38 in a coincidence detection circuit 39 whereby pattern data having an X coordinate coincident with the counted value are supplied to a parallel/serial converting circuit 40. In the parallel/serial converting circuit 40, parallel pattern data are converted into serial pattern data which are supplied through a gate circuit 42 to a CRT screen 9. The gate circuit 42 is controlled to be turned on and off in accordance with a content of a starting coordinates registration circuit 43 by the CPU 2. The content thereof is X and Y coordinates by which the starting coordinates of a display region is defined on a display screen.

Figure 3A:
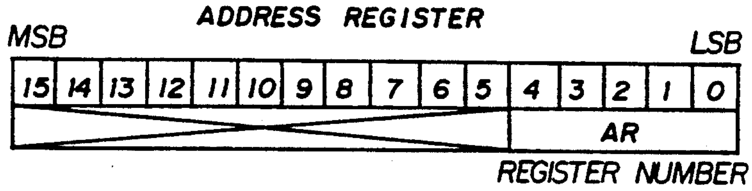
FIGS. 3A, 3B, 3C, 3D, 3E, 3F, 3G, 3H, 3I, 3J, 3K, 3L, 3M, 3N, 3O, 3P, 3Q, 3R, 3S, 3T to 3U are explanatory diagrams showing registers included in a control unit of the apparatus in FIG. 2A.
Figure 3B:
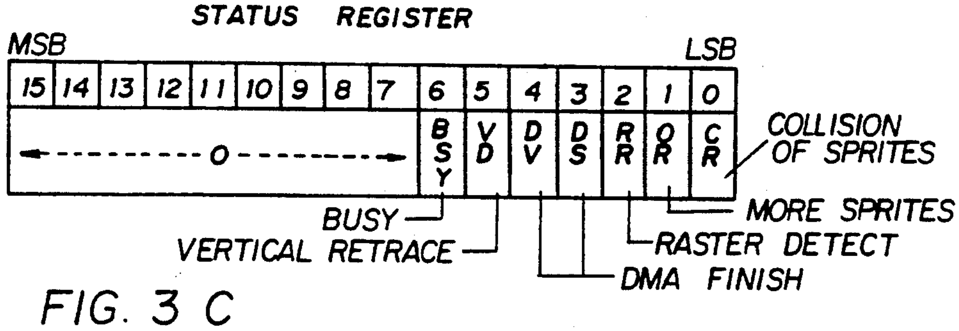
Figure 3C:
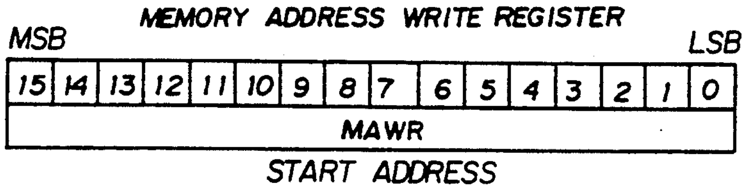
Figure 3D:
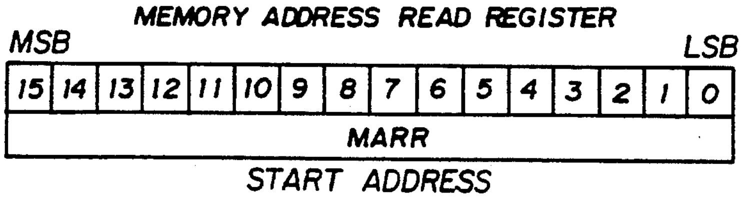
Figure 3E:
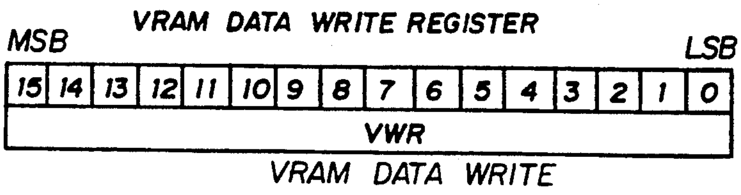
Figure 3F:
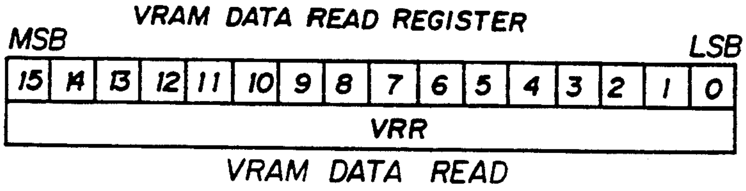
Figure 3G:
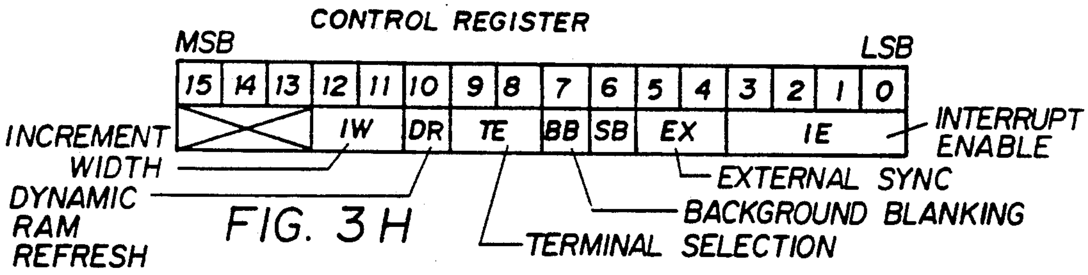
Figure 3H:
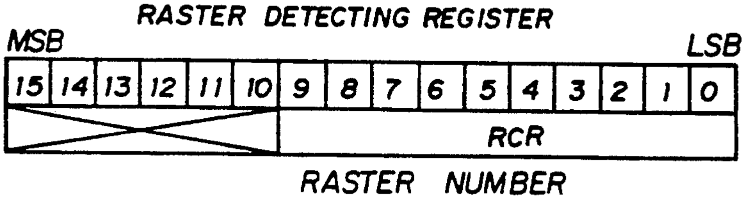
Figure 3I:
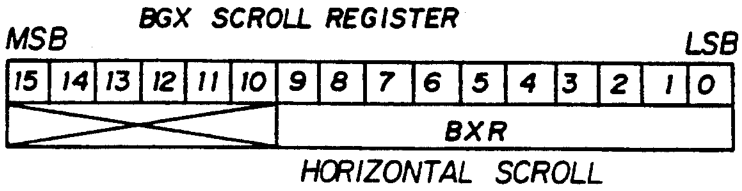
Figure 3J:
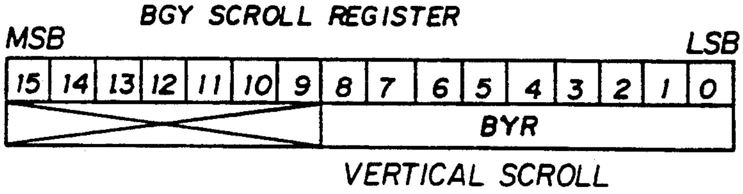
Figure 3K:
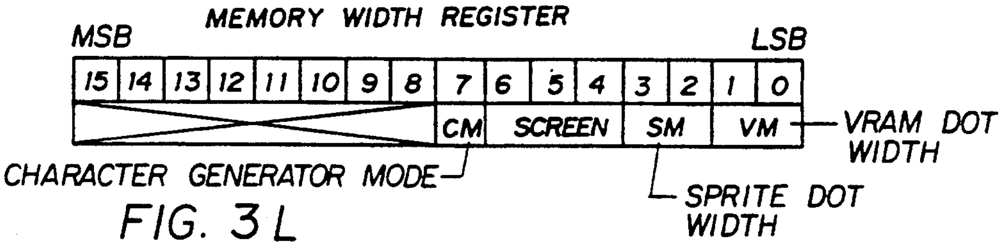
Figure 3L:
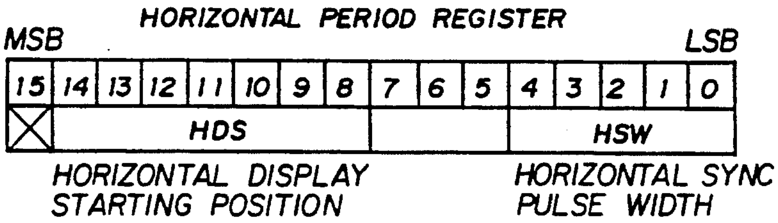
Figure 3M:
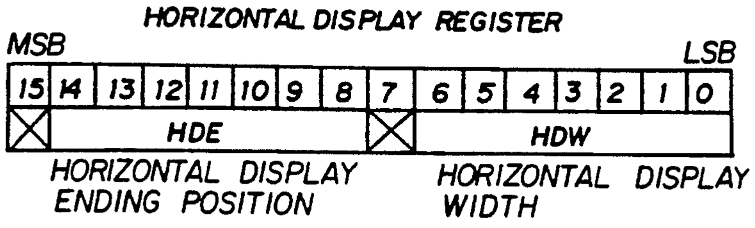
Figure 3N:
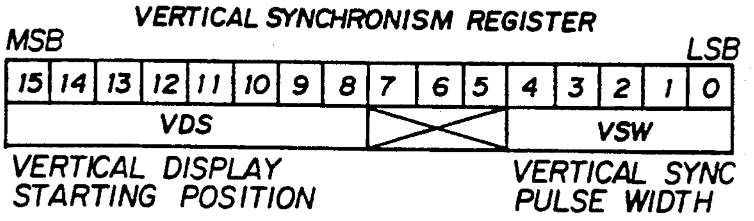
Figure 3O:
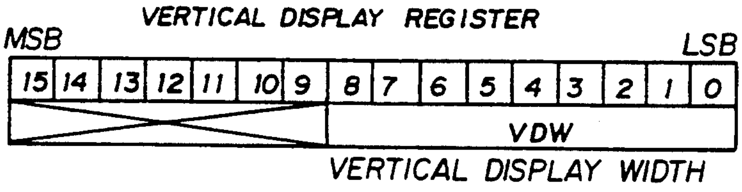
Figure 3P:
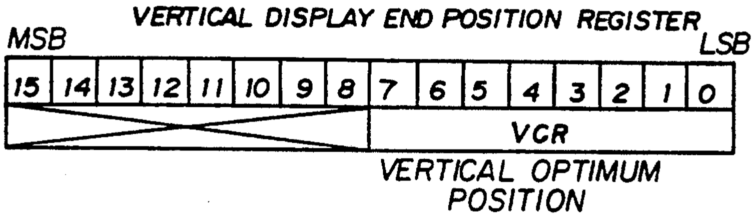
Figure 3Q:
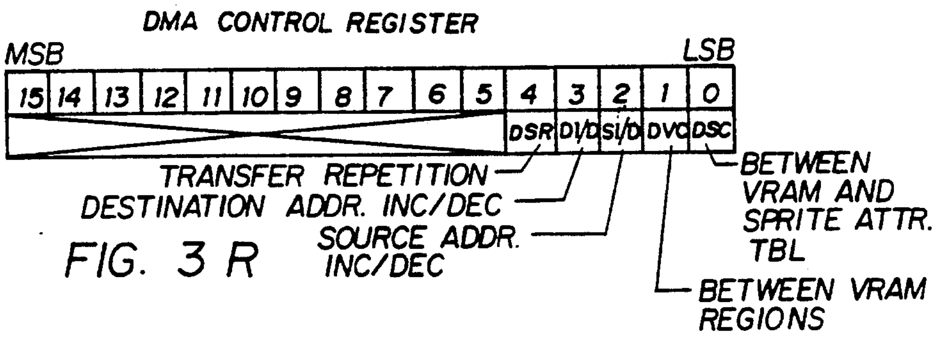
Figure 3R:
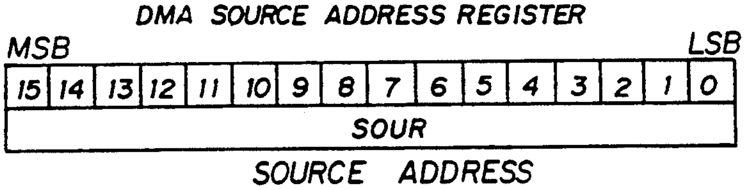
Figure 3S:
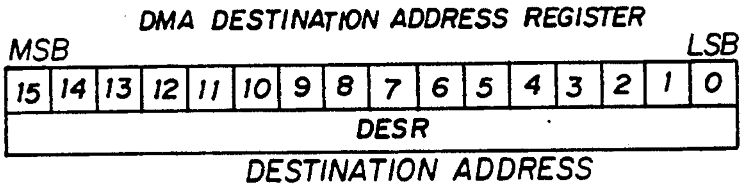
Figure 3T:
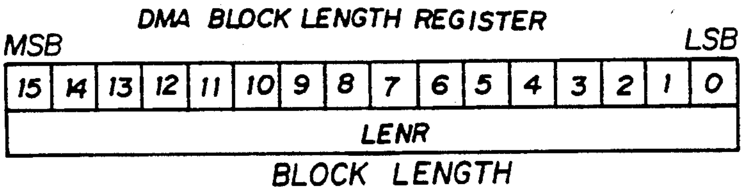
Figure 3U:
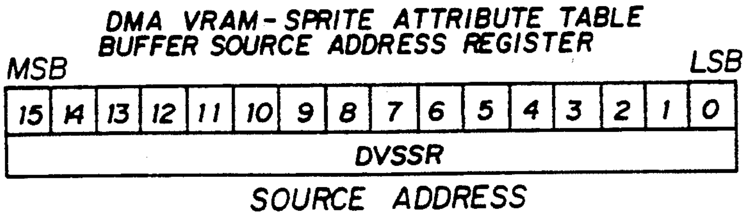

In FIGS. 3A to 3U, there are shown various kinds of registers included in the control unit 20 of the video display controller 1.

(a) Address register (FIG. 3A)

A register number "AR" is exclusively written into the address register for designating one of memory address write register to DMA VRAM-SATB source address register as shown FIGS. 3C to 3U so that data are written into the designated register or read therefrom. The address register is selected when a signal is written into the video display controller 1 under the condition that the A1 and $\overline{CS}$ terminals thereof are "L".

In a case where 16 bit data bus is selected, the EX $8/\overline{16}$ terminal is "0", the A1 terminal is "0", the R/W terminal is W, and the A0 terminal is no matter.

In a case where 8 bit data bus is selected, the EX $8/\overline{16}$ terminal is "1", the A0 and A1 terminals are "0", and the R/W terminal is W.

(b) Status register (FIG. 3B)

A bit corresponding to one of interruption jobs is set to be "H" in the status register to make the interruption active when a cause of the interruption which is enabled by an interruption permission bit of a control register and DMA control register as shown in FIGS. 3G and 3Q is occured. When the status is read from the status register, the corresponding bit is cleared automatically. The status indicating bits are as follows.

(1) bit 0 (CR)—collision of sprites

It is indicated that the sprite number 0 of a sprite is collided with any one of the sprite numbers 1 to 63 of sprites.

(2) bit 1 (OR)—more sprites than a predetermined number (2.1) a case where more than 17 sprites are detected on a single raster line.

(2.2) a case where data of a sprite which is designated are not transferred to a data buffer in a horizontal retrace period.

(2.3) a case where a bit of CGX in control data of a sprite by which two sprites are jointed in a horizontal direction is set so that data of the sprites are not transferred to a data buffer.

(3) bit 2 (PR)—detection of raster

It is indicated that a value of a raster counter becomes a predetermined value of a raster detecting register.

(4) bit 3 (DS)—finishing of DMA transfer

It is indicated that data transfer between the VRAM 7 and sprite attribute table buffer 23 is finished.

(5) bit 4 (DV)—finishing of DMA transfer

It is indicated that data transfer between two regions of the VRAM 7 is finished.

(6) bit 5 (VD)—vertical retrace period

It is indicated that the VRAM 7 is accessed for the writing or reading of date by the CPU 2 so that the $\overline{BUSY}$ terminal is "0".

(c) Memory address write register (register number "00", FIG. 3C)

A starting address "MAWR" is written into the memory address write register so that the writing of data begins at the starting address of the VRAM 7.

(d) Memory address read register (register number "01", FIG. 3D)

A starting address "MARR" is written into the memory address read register. When the upper byte of the starting address is written thereinto, data are begun to be read from the starting address of the VRAM 7 so that data thus read are written into a VRAM data read register as shown in FIG. 3F. Thereafter, the starting address "MARR" is automatically incremented by one.

(e) VRAM data write register(register number "02", FIG. 3E)

Data which are transferred from the CPU 2 to the VRAM 7 are written into the VRAM data write register. When the upper byte of the data "VWR" is written thereinto, the video display controller 1 begins to write the data into the VRAM 7 and the address "MAWR" of the memory address write register is automatically incremented by one upon the writing of the data.

(f) VRAM data read register (register number "02", FIG. 3F)

Data which are transferred from the VRAM 7 to the CPU 2 are written into the VRAM data read register. When the upper byte of the data "VRR" is read therefrom, the reading of data is performed at the following address of the VRAM 7.

(g) Control register (register number "05", FIG. 3G)

An operating mode of the video display controller 1 is controlled in accordance with the following bits of the control register.

(1) bits 0 to 3 (IE)—enable of interruption request (1.1) bit 0—collision detection of sprites (1.2) bit 1—excess number detection of sprites (1.3) bit 2—raster detection (1.4) bit 3—detection of vertical retrace period (2) bits 4 and 5 (EX)—external synchronism

| bit | | |
|---|---|---|
| 5 | 4 | content |
| 0 | 0 | $\overline{\text{VSYNC}}$ and $\overline{\text{HSYNC}}$ are inputs, and synchronous to external signals |
| 0 | 1 | $\overline{\text{VSYNC}}$ is and input, and sychronous to external signals, while $\overline{\text{HSYNC}}$ is an output |
| 1 | 0 | non-used |
| 1 | 1 | $\overline{\text{VSYNC}}$ and $\overline{\text{HSYNC}}$ are outputs |

(3) bit 6 (SB)—sprite blanking

It is decided whether a sprite should be displayed on a screen or not. The control of the bit is effective in the following horizontal display period.

(3.1) "0"—blanking of a sprite (3.2) "1"—display of a sprite (4) bit 7 (BB)—background blanking It is decided whether background should be displayed on a screen or not. The control of the bit is effective in the following horizontal display period.

(4.1) "0"—blanking of background (4.2) "1"—display of background

As a result, when the bits 6 and 7 are both "0", there is resulted in "burst mode" in which the following operations can be performed.

(3.4.1) The access to the VRAM 7 is not performed for a display, but the VRAM 7 is accessed by the CPU 2.

(3.4.2) DMA between two regions of the VRAM 7 is possible to be performed at any time.

In such an occasion, the terminals VD0 to VD 7 are all "L", while the SPBG terminal is "H".

On the other hand, when the bits 6 and 7 are both "1", there is released from the "burst mode".

(5) bits 8 and 9 (TE)—selection of DISP terminal outputs

| Bit | | DISP | |
|---|---|---|---|
| 9 | 8 | output | Content |
| 0 | 0 | DISP | output "H" during display |
| 0 | 1 | BURST | color burst inserting position is indicated by output "L" |
| 1 | 0 | INTHSYNC | internal horizontal synchronous signal |
| 1 | 1 | | non-used |

(6) bit 10 (DR)—dynamic RAM refresh

Refresh address is supplied from the terminals MA0 to MA15 upon the setting of the bit in a case where a VRAM dot width is of 2 dots or 4 dots for background in a memory width register as shown in FIG. 3K.

(7) bits 11 and 12 (IW)—increment width selection of the memory address write register or memory address read register A width which is incremented in address is selected as follows.

| bit | | |
|---|---|---|
| 12 | 11 | increment width |
| 0 | 0 | +1 |
| 0 | 1 | +20H |
| 1 | 0 | +40H |
| 1 | 1 | +80H |

In a case of 8 bit access, an address is incremented upon the upper byte.

(h) Raster detecting register (register number "06", FIG. 3H)

A raster number "RCR" at which an interruption job is performed is written into the raster detecting register. An interruption signal is produced when a value of a raster counter is equal to the raster number "RCR". The raster counter is preset to be "64"at a preceding scanning raster line to a display starting raster line as described in more detail later, and is increased at each raster line by one.

(i) BGX scroll register (register number "07", FIG. 3I)

The BGX scroll register is used for a horizotal scroll of background on a screen. When a content "BXR" is re-written therein, the content is effective in the following raster line.

(j) BGY scroll register (register number "08", FIG. 3J)

The BGY scroll register is used for a vertical scroll of background on a screen. When a content "BYR" is re written therein, the content is effective to be as "BYR+1" in the following raster line.

(k) Memory width register (register number "09", FIG. 3K)

(1) bits 0 and 1 (VM)—VRAM dot width

A dot width in which an access to the background attribute table and character generator, DMA and access of the CPU 2 to the VRAM 7 during a horizontal display period are performed is written into the bits of the memory width register. The dot width is decided dependent on a memory speed of the VRAM 7. When the bits 0 and 1 are re-written therein, the content is effective at the beginning of a vertical retrace period.

| bit | | dot | Disposition in one character cycle (8 dots) | | | | | | | |
|---|---|---|---|---|---|---|---|---|---|---|
| 1 | 0 | width | 1 | 2 | 3 | 4 | 5 | 6 | 7 | 8 |
| 0 | 0 | 1 | CPU | BAT | CPU | | CPU | CG0 | CPU | CG1 |
| 0 | 1 | 2 | BAT | | CPU | | CG0 | | CG1 | |
| 1 | 0 | 2 | BAT | | CPU | | CG0 | | CG1 | |
| 1 | 1 | 4 | BAT | | | | CG0/CG1 | | | |

"BAT" is for background attribute table, and "CG" is for character generator.

(2) bits 2 and 3 (SM)—sprite dot width

A dot width in which an access to the sprite generator is performed during a horizontal retrace period is written into the bits of the memory width register.

| bit | | dot | Disposition in one character cycle (8 dots) | | | | | | | |
|---|---|---|---|---|---|---|---|---|---|---|
| 3 | 2 | width | 1 | 2 | 3 | 4 | 5 | 6 | 7 | 8 |
| 0 | 0 | 1 | SP0 | SP1 | SP2 | SP3 | SP0 | SP1 | SP2 | SP3 |
| *0 | 1 | 2 | SP0 | | SP1 | | SP0 | | SP1 | |
| | | | SP2 | | SP3 | | SP2 | | SP3 | |
| 1 | 0 | 2 | SP0 | | SP1 | | SP2 | | SP3 | |
| **1 | 1 | 4 | SP0 | | | | SP1 | | | |

-continued

| bit | | dot | Disposition in one character cycle (8 dots) | | | | | | | |
|---|---|---|---|---|---|---|---|---|---|---|
| 3 | 2 | width | 1 | 2 | 3 | 4 | 5 | 6 | 7 | 8 |
| | | | | SP2 | | | | | SP3 | |

(note)
*(SP0 SP1) or (SP2 SP3) is selected dependenton LSB bit of a pattern code.
**SP0 to SP3 are read in two consecutive character cycles.

(3) bits 4 to 6 (SCREEN)

The number of characters in X and Y directions of a fictitious screen is decided dependent on the content of the bits. When a content is re-written into the bits, the content is effective at the beginning of a vertical retrace period.

| bit | | | Number of characters | |
|---|---|---|---|---|
| 6 | 5 | 4 | X | Y |
| 0 | 0 | 0 | 32 | 32 |
| 0 | 0 | 1 | 64 | 32 |
| 0 | 1 | 0 | 128 | 32 |
| 0 | 1 | 1 | 128 | 32 |
| 1 | 0 | 0 | 32 | 64 |
| 1 | 0 | 1 | 64 | 64 |
| 1 | 1 | 0 | 128 | 64 |
| 1 | 1 | 1 | 128 | 64 |

(4) bit 7 (CM)—CG mode

When a VRAM dot width is of 4 dots, a color block of a character generator is changed dependent on the bit. A content is written into the bit, the content is effective in the following raster line.

(1) Horizontal synchronous register (register number "OA", FIG. 3L)

(1) bits 1 to 4 (HSW)—horizontal synchronous pulse

A pulse width of "L" level of a horizontal synchronous pulse is set as an unit of a character cycle. One of 1 to 32 is selected by using 5 bits to comply with a specification of a CRT display.

(2) bits 8 to 14 (HDS)—starting position of horizontal display

A period between a rising edge of a horizontal synchronous signal and a starting time of a horizontal display is set as an unit of a character cycle. An optimum position in the horizontal direction on a CRT display is decided by a content of the 7 bits. When it is assumed that a horizontal display position (horizontal back porch) is "N", "N−1" is written into the HDS bits.

(m) Horizontal display register (register number "OB", FIG. 3M)

(1) bits 0 to 6 (HDW)—horizontal display width

A display period in each raster line is set as an unit of a character cycle, and is decided in accordance with the number of characters in the horizontal direction on a CRT screen dependent on a content of the 7 bits. If it is assumed that a horizontal display position is "N", "N−1" is written into the HDW bits.

(2) bits 8 to 11 (HDE)—horizontal display ending position

A period between an ending of a horizontal display period and a rising edge of a horizontal synchronous signal is set as an unit of a character cycle. An optimum position of a horizontal display is set on a CRT display by the 7 bits. When it is assumed that a horizontal display ending position (horizontal back porch) is "N", "N −1" is written into the HDE bits.

(n) Vertical synchronous register (register number "OC", FIG. 3N)

(1) bits 0 to 4 (VSW)—vertical synchronous pulse width

A pulse width of a vertical synchronous signal is decided in a width of "L" level as an unit of a raster line. One of 1 to 32 is selected to comply with a specification of a CRT display.

(2) bits 8 to 15 (VDS)—vertical display starting position

A period between a rising edge of a vertical synchronous signal and a vertical synchronous starting position is set as an unit of a raster line. When it is assumed that a vertical display starting position (vertical back porch) is "N", "N−2" is written into the bits.

(o) Vertical display register (register number "OD", FIG. 30)

A vertical display period (display region) is set as an unit of a raster line. A vertical display width is decided in accordance with the number of raster lines to be displayed on a CRT display which is defined by a content of the 9 bits. When it is assumed that a vertical display width is "N", "N−1" is written into the VDW bits.

(p) Vertical display ending position register (register number "OE", FIG. 3P)

A period between a vertical display ending position and a rising edge of a vertical synchronous signal is set as an unit of a raster line. When it is assumed that a vertical optimum position (vertical front porch) is "N" to be defined by the 8 bits, "N" is written into the VCR bits.

(q) DMA control register (register number "OF", FIG. 3Q)

(1) bit 0 (DSC)—enable of interruption at the finishing of transfer between the VRAM7 and sprite attribute table buffer 23.

It is decided whether or not an interruption is enabled at the finishing time of the transfer.

(1.1) "0"—disable (1.2) "1"—enabled of interruption (2) bit 1 (DVC)—enable at the finishing of transfer between two regions of the VRAM 7.

It is decided whether or not an interruption is enabled at the finishing time of the transfer.

(2.1) "0"—disable (2.2) "1"—enabled (3) bit 2 (SI/D)—increment/decrement of a source address One of automatical increment and decrement of a source address is selected in a transfer between two regions of VRAM 7.

(3.1) "0"—increment (3.2) "1"—decrement (4) bit 3 (DI/D)

One of automatical increment and decrement of a destination address is selected in a transfer between two regions of VRAM 7.

(4.1) "0"—increment (4.2) "1"—decrement (5) bit 4 (DSR)—repetition of a transfer between the VRAM 7 and sprite attribute table buffer 23.

It is decided whether or not a repetition of a transfer between the VRAM 7 and sprite attribute table buffer 23 is enabled.

(r) DMA source address register (register number "10", FIG. 3R)

A starting address of a source address is allocated in a transfer between two regions of the VRAM 7.

(s) DMA destination address register (register number "11", FIG. 3S)

A starting address of a destination address is allocated in a transfer between two regions of the VRAM7.

(t) DMA block length register (register number "12", FIG. 3T)

A length of a block is defined in a transfer between two regions of the VRAM 7.

(u) DMA VRAM-SATB source address register (register number "13", FIG. 3U)

A starting address of a source address is allocated in a transfer between the VRAM7 and sprite attribute table buffer 23.

Figure 4A:
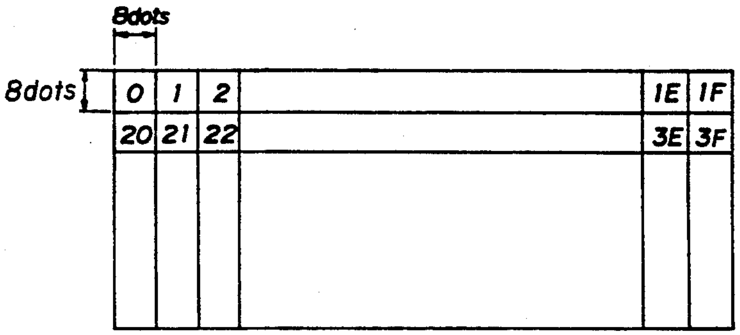
FIG. 4A is an explanatory diagram showing a fictitious screen.

In FIG. 4A, there is shown an address in a background attribute table for a character on a fictitious screen. A character and color to be displayed at each character position are stored in the background attribute table. A predetermined number of background attribute tables are stored in a region the first address of which is "0" in the VRAM 7. The fictitious screen shown therein which is one example is of 32×32 characters (1F=32).

Figure 4B:
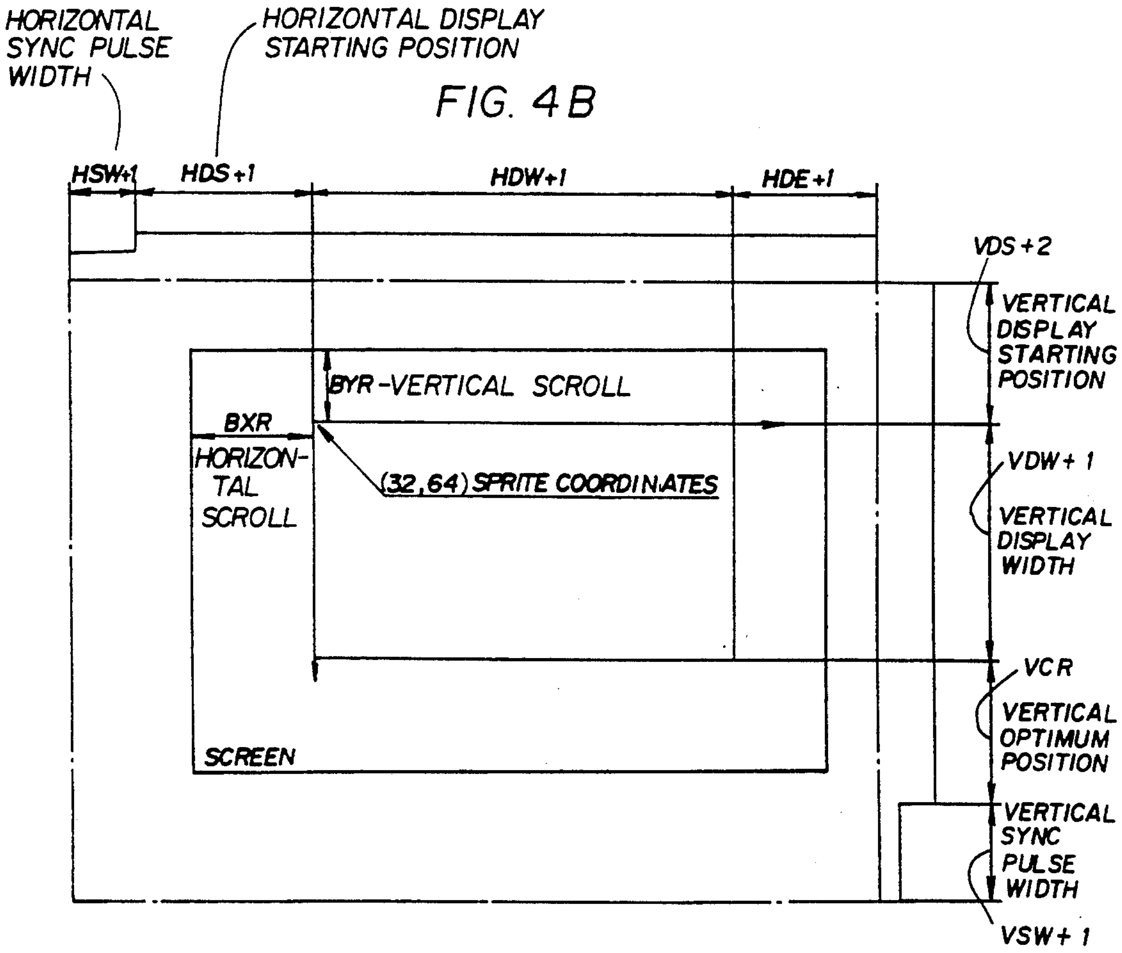
FIG. 4B is an explanatory diagram showing a display region on a screen.

In FIG. 4B, there is shown a screen which is framed by writing respective predetermined values into the aforementioned horizontal synchronous register, horizontal display register, vertical synchronous register and vertical display register as shown in FIGS. 3L, 3M, 3N and 30. Although the respective predetermined values for the registers are not explained here, a display region is defined in accordance with "HDW+1" in the horizontal display register and "VDW+1" in the vertical display register. In the embodiment, the starting coordinates (x,y) for the display region is indicated to be as (32, 64).

Figure 5A:
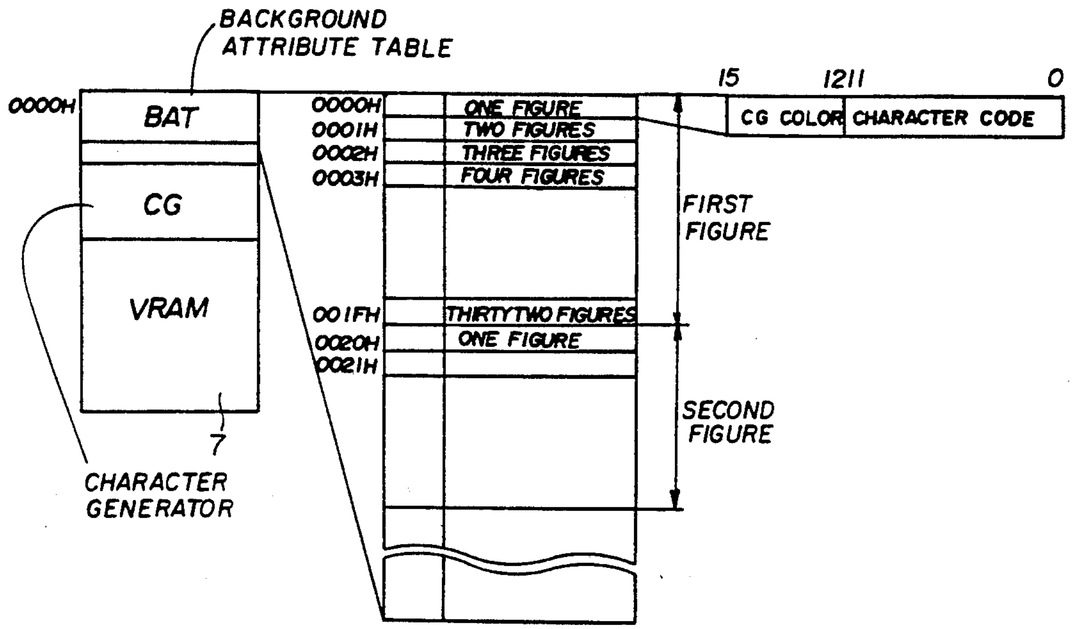
FIGS. 5A and 5B are explanatory diagrams showing a background attribute table in the VRAM.
Figure 5B:
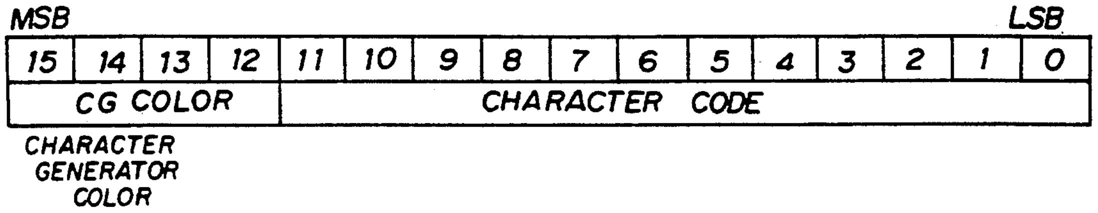

In FIGS. 5A and 5B, there are shown background attribute tables (BATs) in the VRAM 7 each of 16 bits to have a character code of lower 12 bits for designating a pattern number of a character and a CG color of upper 4 bits for designating a CG color code.

Figure 6A:
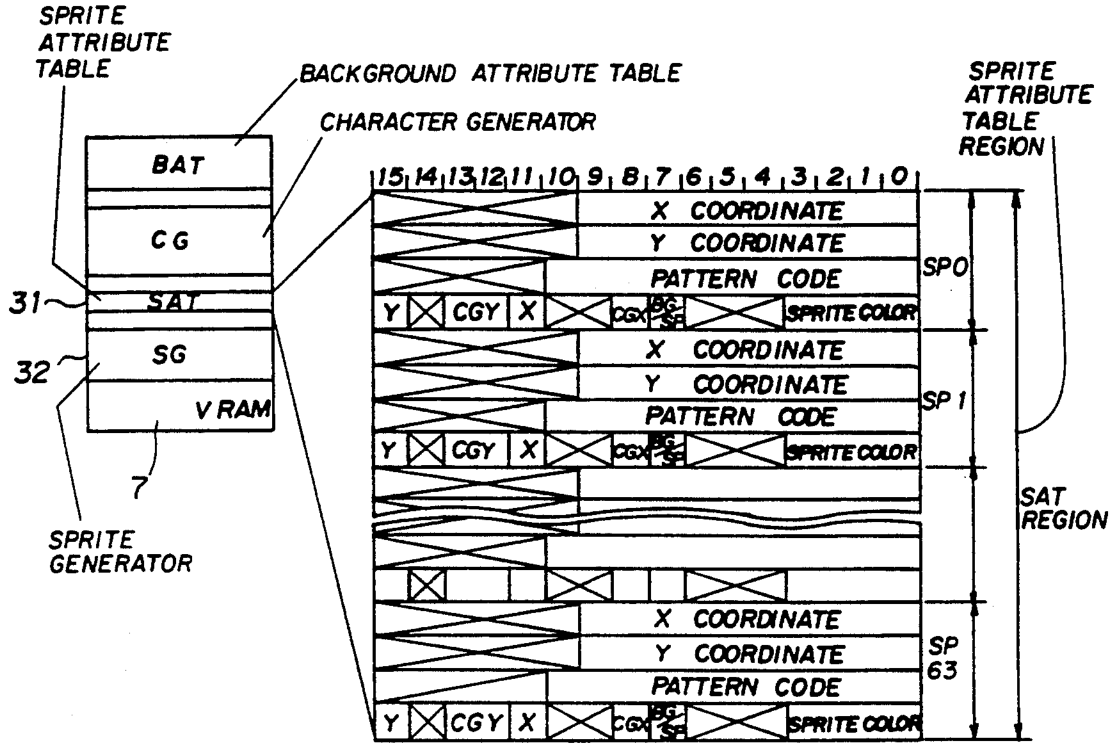
FIGS. 6A and 6B are explanatory diagrams showing a sprite attribute table in the VRAM.
Figure 6B:
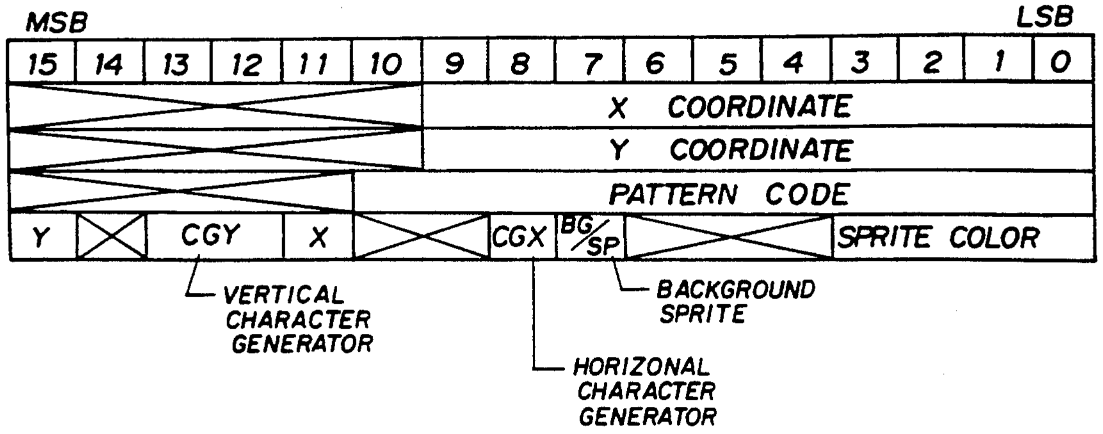

In FIGS. 6A and 6B, there are shown sprite attribute tables (SATs) 31 in the VRAM along with a sprite generator region 32. Each of the sprite attribute tables 31 is composed of 16×4 bits, that is, four words to define a sprite. Therefore, sixty-four sprites are defined by 256 words. In the sprite attribute table, lower 10 bits in the first word designate a horizontal position (0 to 1023) of a sprite. For this purpose, one of 0 to 1023 is written into an X coordinate therein. In the same manner, lower 10 bits in the second word designate a vertical position (0 to 1023) of a sprite, and one of 0 to 1023 is written into a Y coordinate therein. On the other hand, lower 11 bits in the third word is for a pattern number which is an address for a sprite generator 32, while the fourth word is for control bits including Y ($X_{15}$), CGY (two bits of $X_{13}$ and $X_{12}$), $\overline{X}$ ($X_{11}$), CGX($X_8$), BG/SP ($X_7$) and a color for a sprite (four bits of $X_3$ to $X_9$) in the direction of MSB to LSB.

The control bits are defined as follows. (1) setting of $\overline{Y}$

A sprite is displayed to be reversed in the Y direction.

(2) setting of CGX

Two sprites consisting of a sprite to be addressed in the sprite generator 32 and the other sprite of the following address are displayed to be joined in the horizontal direction.

(3) setting of X

A sprite is displayed to be reversed in the X direction.

(4) setting of CGY

The two bits X and X define three modes to be described in more detail later.

| | | |
|---|---|---|
| 0 | 0 | Normal |
| 0 | 1 | 2CGY |
| 1 | 0 | non-used |
| 1 | 1 | 4CGY |

(5) BG/SP

The bit X designates a priority between displays of a background and sprite.

(5.1) "0"—background (5.2) "1"—sprite (6) sprite color

The bits X to X designate an area color of a sprite.

Each sprite has four facets to be called SG0 to SG3 each being of 16×16 dots so that one sprite occupies 64 words.

The writing of data into a sprite attribute table 31 is performed such that the data are not transferred from the CPU 2 directly to the VRAM 7, but in DMA transfer from the CPU2 to the sprite attribute table buffer 23.

Figure 7:
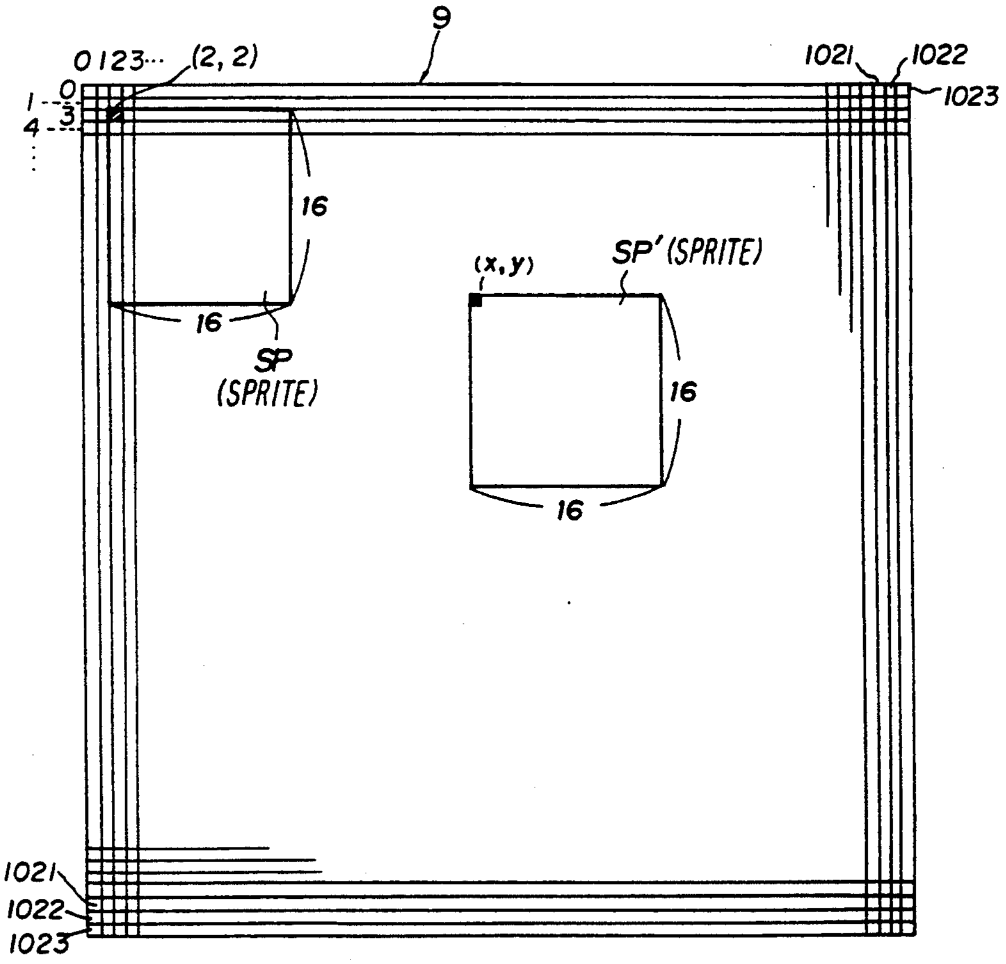
FIG. 7 is an explanatory diagram explaining an operation in which a sprite is moved on a screen.

In operation, a sprite SP having standard coordinates (2,2) is displayed on a display screen 9 having 1024 display dots respectively in the X and Y directions as shown in FIG. 7. In displaying the sprite SP thereon, the Y coordinates of the sixty-four sprite attribute tables 31 are compared in turn with a raster signal supplied from the scanning raster signal producing circuit 33 at the coincidence detection circuit 34 to pick up sprites each having a Y coordinate "2" which is then stored in its stripe number among the stripe numbers 0 to 63 into the pattern code buffer 35 when a horizontal display period of a scanning raster number "1" is started in the apparatus as shown in FIG. 2B. In this occasion, sixteen of sprites can be stored in the pattern code buffer 35 at the maximum. During a horizontal retrace period before which a scanning raster number "1" is finished and after which a scanning raster number "2" is started, address signals are produced in the selector 36 in accordance with the sprite numbers stored in the pattern code buffer 35 and pattern codes in the sprite attribute tables 31 so that pattern data are read from the sprite generator 32 in accordance with the address signals thus produced. The pattern data are stored in the pattern data buffer 37 along with X coordinates corresponding thereto in the sprite attribute tables 31. When a horizontal display period of the scanning raster number "2" is started, the X coordinates stored in the pattern data buffer 37 are compared with counted values of the horizontal dot clock counter 38 at the coincidence detection circuit 39. In the comparison, pattern data for the sprite sp are read to be supplied to the parallel/serial converting circuit 40 from the pattern data buffer 37 when the counted value corresponds to x=2. The parallel pattern data are converted into serial pattern data in the parallel/serial converting circuit 40 so that a picture element (2, 2) of the sprite sp is displayed on the CPT screen 9 in accordance with the serial pattern data passed through the gate circuit 42. Thereafter, fifteen picture elements (3, 2), (4, 2)—(17, 2) are displayed thereon to complete the display of the sprite sp on the y=2 raster line. As a matter of course, control data of the sprite attribute table 31 corresponding to the sprite sp are used to control the display thereof. In moving the sprite sp having the standard coordinates (2, 2) to a display position having a standard coordinates (X, Y) to be a sprite sp', the X and Y coordinates (2, 2) of the sprite attribute table 31 corresponding to the sprite sp are only changed to be X and Y coordinates (x, y) without changing contents of the sprite generator 32 and necessitating the re-definition of a pattern. The sprites sp and sp' are displayed in accordance with the combination of more than one facets among the four facets SG0 to SG3.

Figure 8:
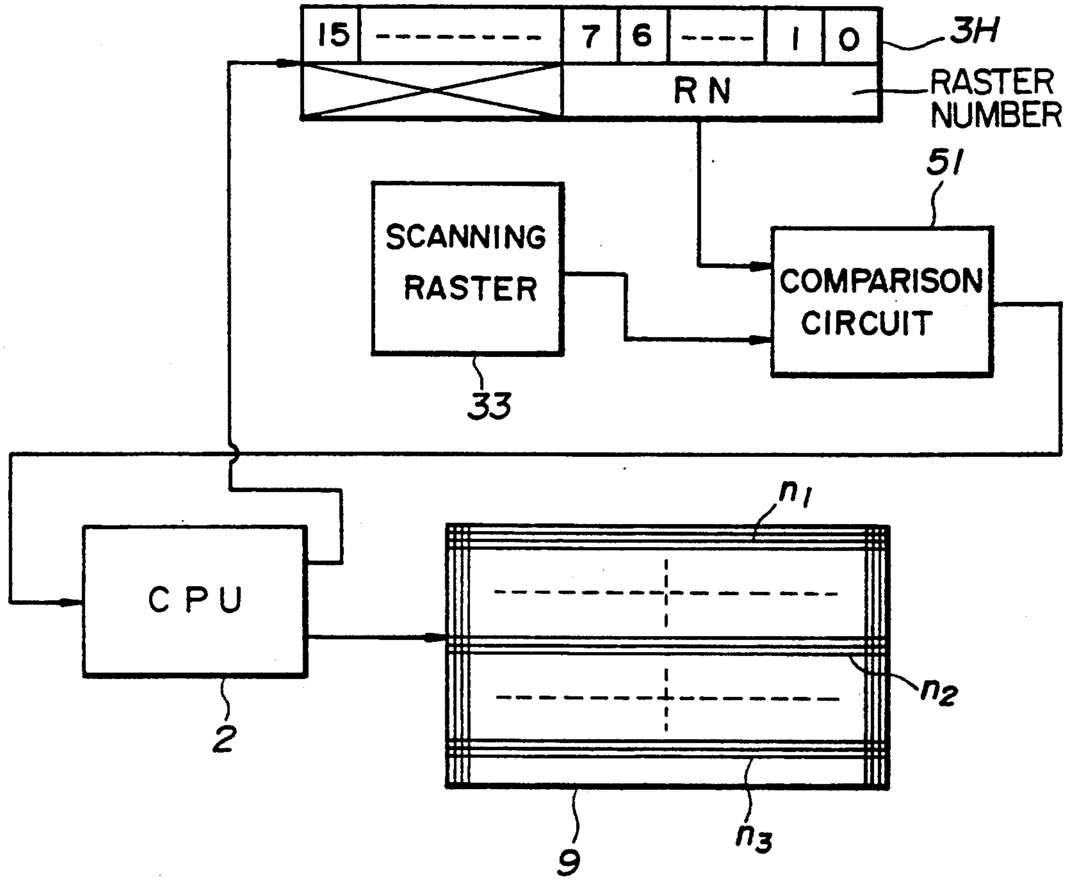
FIG. 8 is a block diagram showing an apparatus for controlling the access of a video memory in a first embodiment according to the invention, FIGS. 9A, 9B and, 9C are explanatory diagrams showing controlling modes in the apparatus in FIG. 8.

In FIG. 8, there is shown an apparatus for controlling the access of a video memory in a first embodiment according to the invention. The apparatus comprises a CPU 2, a raster setting register 50, a circuit 33 for producing scanning raster signals, a comparison circuit 51 including a raster counter (not shown) which counts the scanning raster signals for comparing the counted value N of the raster counter with a raster number RN of the raster setting register 50, and a displaying screen 9 which is controlled to display a background and a sprite by the CPU 2. The raster number RN is defined by 8 bits of 0 to 7 so that one of the raster number 0 to 256 ($2^8=256$) can be set therein.

Figure 9A:
Figure 9B:
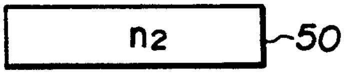
Figure 9C:

In operation, the raster number RN of the raster setting register 50 is set to be n: as shown in FIG. 9A by the CPU 2. The raster counter of the comparison circuit 51 counts the scanning raster signals supplied from the circuit 33. When the counted value N is equal to and larger than 0, and less than the set value n:($0 \leqq N < n_1$), the set value $n_1$ is held therein. When the counted value N is equal to the set value $n_1$, the comparison circuit 51 supplies a coincidence signal to the CPU 2 so that the raster number RN of the raster setting register 50 is then set to be $n_2$ by the CPU 2 as shown in FIG. 9B. When the counted value N is equal to and larger than $n_1$, and less than the set value $n_2$ ($n_1 < N = < n_2$), the set value $n_2$ is held therein. When the counted value N is equal to the set value $n_2$, a second coincidence signal is supplied from the comparison circuit 51 to the CPU 2 so that the raster number RN of the raster setting register 50 is set to be $n_3$ by the CPU 2 as shown in FIG. 9C. In the same manner, a third coincidence signal is supplied from the coincidence circuit 51 when the counted value N is equal to the setting value $n_3$. Upon receiving the first to third coincidence signals, the CPU 2 divides the displaying screen 9 into four regions in accordance with the raster numbers $n_1$, $n_2$ and $n_3$. For instance, the displaying screen 9 is controlled to display patterns of different pages on the four divided regions by the CPU 2. Otherwise, another interruption signal may be produced when the aforementiond coincidence signal is supplied to the CPU 2.

Figure 10:
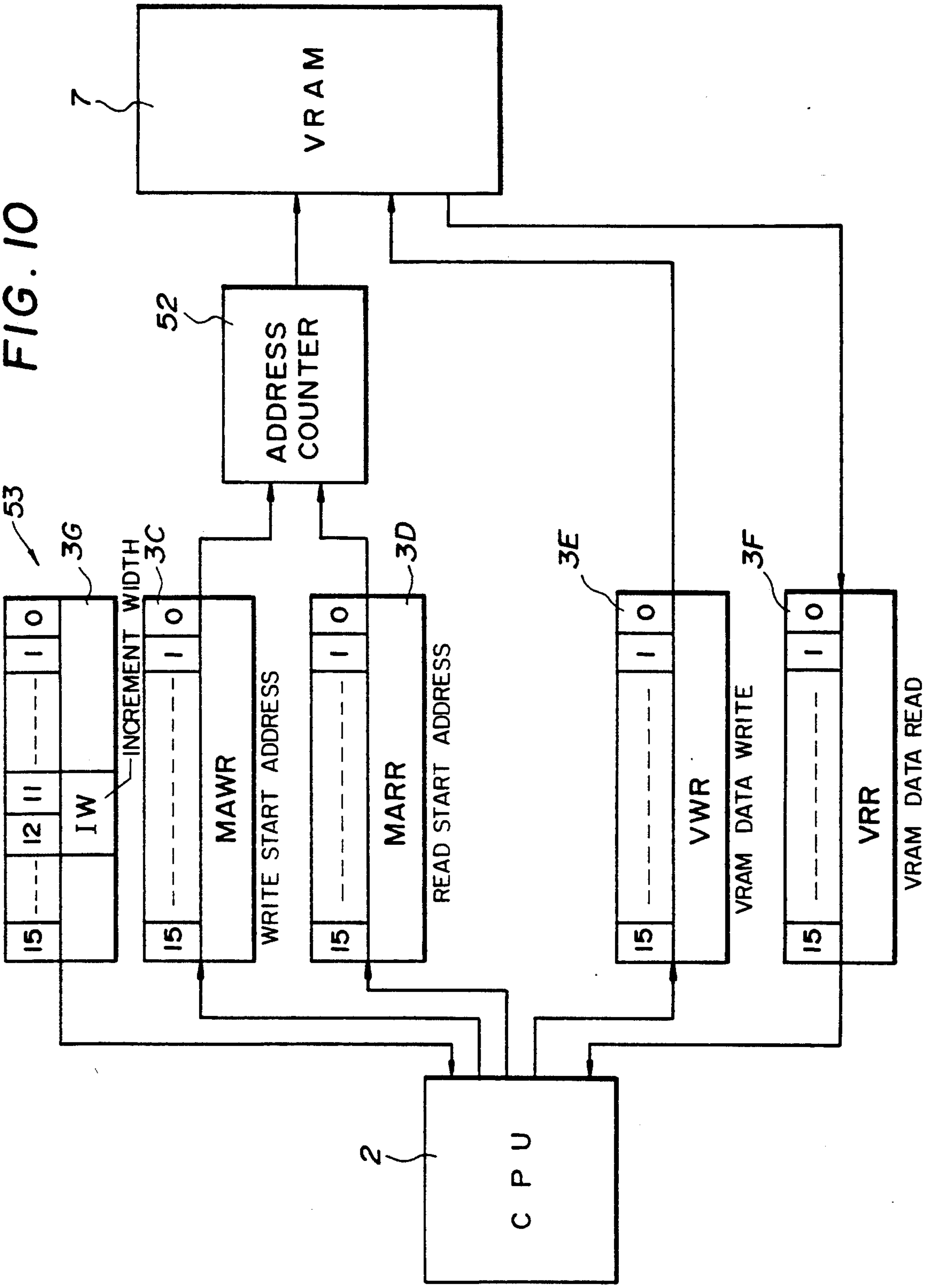
FIG. 10 is a block diagram showing an apparatus for controlling the access of a video memory in a second embodiment according to the invention.

In FIG. 10, there is shown an apparatus for controlling the access of a video memory in a second embodiment according to the invention. The apparatus comprises a CPU 2, a group of registers 53, an address counter 52, and a VRAM 7. The group of registers 53 includes a memory address write register 3C, a memory address read register 3D, a VRAM data write register 3E, a VRAM data read register 3F, and a control register 3G as shown in FIG. 3C to 3G. The memory address write register 3C and the memory address read register 3D are connected to the address counter 52 so that the VRAM 7 is accessed in accordance with an address value of the address counter 52. Data are controlled to be written into the VRAM 7 and read therefrom by the CPU 2. The control register 3G includes IW bits of bits 11 and 12 defining an increment width along with other bits as explained in FIG. 3G. A relation between a content of bits 11 and 12 and an increment width is explained at the table on page 19 so that a repeated explanation is not made here.

In a case where the IW bits are "00", an increment width is defined to be "+1". If it is assumed that a starting address of the memory address write register 3C is "0", data of the VRAM data write register 3E are written into a region of an address "0" of the VRAM 7 when the address counter 52 counts a predetermined number corresponding to the address "0". Then, an address of the memory address write register 3C is incremented by "+1" and therefore changed from "0" to "1". The data written into the VRAM 7 corresponds to data of the address "0" on the fictitious screen as shown in FIG. 4A. Next, an address of the VRAM 7 is counted by the address counter 52 in accordance with a content "1" of the memory address write register 3C, and data of the VRAM write register 3E are written into a region of an address "1" of the VRAM 7. In this manner, data corresponding to addresses 0–1F, 20–3F, 40–5F—of horizontal directions of the fictitious screen are sequentially written into the VRAM 7.

In a case where the IW bits are "01", an increment width is defined to be "+20" (hexadecimal code). If it is assumed that a starting address of the memory address write register 3C is "0" data of the VRAM data write register 3E are written into a region of an address "0" of the VRAM 7 when the address counter 52 counts a predetermined number corresponding to the address "0". Then, an address of the memory address write register 3C is incremented by "+20" and therefore changed from "0" to "20". Next, an address of the VRAM 7 is counted by the address counter 52 in accordance with a content "20" of the memory address write register 3C, and data of the VRAM write register 3E are written into a region of an address "20" of the VRAM 7. In this manner, data corresponding to addresses 0, 20, 40, 60—of the fictitious screen are sequentially written into the VRAM 7. As a result, it is said that the present operation is equal to an operation in which a pattern to be displayed in horizontal directions is changed to a pattern to be displayed in vertical directions.

Otherwise, if it is assumed that an increment width is "+40" or "+80", a pattern which is enlarged by two times or four times and displayed in vertical directions is obtained. In addition, if an increment width is appropriately selected to be a predetermined value, an inclination, a rotation and so on of a pattern can be performed. Although the writing of data into the VRAM 7 is explained, the reading of data therefrom is also performed in the same manner as described above.

Next, an apparatus for controlling the access of a video memory in a third embodiment will be explained mainly in conjunction with FIG. 2 and FIGS. 3A to 3U.

In a case where the CPU 2 is a data bus width of sixteen bits, a chip selecting signal "0" is supplied to the terminal $\overline{CS}$ of the video display controller 1 which is thereby enabled. A data bus width signal "0" is supplied through the terminal EX 8/$\overline{16}$ to the control unit 20 of the video display controller 1.

(a) Writing of data into a register

A register number AR of a register into which data are written is written into the address register 3A (at this time, A0=no matter, A1="1"), and the data are written into the selected register of the register number AR (at this time, A0=no matter, A1="1"). As a result, data by which a function such as display modes etc. is selected and by which addresses are set for the video memory 7 are written into registers of the video display controller 1.

(b) Reading of status

A status is read from the status register 3B (at this time, A0=no matter, A1=0).

(c) Writing of data into the VRAM 7

Following procedures (1) to (4) are performed when data are written through the video display controller 1 into the VRAM 7 by the CPU 2.

(1) The register number "00" of the memory address write register 3C is written into the address register 3A.

(2) An address of the VRAM 7 is written into the memory address write register 3C.

(3) The register number "02" of the VRAM data write register 3E is written into the address register 3A.

(4) Data are written into the VRAM data write register 3E so that the data are written into a region of the address of the VRAM 7. Then, a content of the memory address write register 3C is incremented by a value determined in accordance with the IW bits of the control register 3G.

The procedures (1) to (4) are repeated by the number of steps which is necessary to write a predetermined amount of data into the VRAM 7.

(d) Reading of data from the VRAM 7 Following procedures (1) to (4) are performed when data are read through the video display controller 1 from the VRAM 7 by the CPU 2.

(1) The register number "01" of the memory address read register 3D is written into the address register 3A.

(2) An address of the VRAM 7 is written into the memory address read register 3D.

(3) The register number "03" of the VRAM data read register 3F is written into the address register 3A.

(4) Data are written into the VRAM data read register 3F so that the data are read from a region of the address of the VRAM 7. Then, a content of the memory address read register 3D is incremented by a value determined in accordance with the IW bits of the control register 3G.

On the other hand, in a case where the CPU 2 is a data bus width of eight bits, a chip selecting signal "0" is supplied to the terminal $\overline{CS}$ of the video display controller 1 which is thereby enabled. A data bus width signal "1" is supplied through the terminal EX8/$\overline{16}$ to the control unit 20 of the video display controller 1.

(a) Writing of data into a register (1) A register number AR of a register into which data are written is written into the address register 3A (at this time, A0=0, A1=1).

(2) A lower byte of the data is written into the selected register of the register number AR (at this time, A0=0, A1=1).

(3) An upper byte of the data is written into the selected register (at this time, A0=1, A1=1).

(b) Reading of status

A lower byte of status data is read from the status register 3B, while an upper byte of "00" is read therefrom.

(c) Writing of data into the VRAM 7

Procedures of an eight bit data bus width are basically the same as those of a sixteen bit data bus width as described before, provided that a lower byte of data and an upper byte thereof are sequentially processed when an address is written into the memory address write register 3C and data are written into the VRAM data write register 3E. At this time, an address of the memory address write register 3C is incremented by a value determined in accordance with the IW bits of the control register as described before.

(d) Reading of data from the VRAM 7

This is also the same as in a sixteen bit data bus width, provided that a lower byte of data and an upper byte thereof are sequentially processed.

The writing of data into the VRAM 7 will be described in more detail. At first, the register number "00" of the memory address write register 3C is written into the address register 3A. Next, a starting address for the writing of data is divided into a lower byte and an upper byte which are written into the memory address write register 3C in a sequential order of the upper byte after the lower byte. Thereafter, a lower byte of data is written into the VRAM data write register, and an upper byte of the data is then written thereinto. Upon the writing of the upper byte, a content of the memory address write register 3C is incremented by a value determined in accordance with the IW bits of the control register 3G.

In this manner, an image is displayed on a displaying screen of a television 9 under a selected one of a sixteen and eight bit data bus widths. In more detail, an address of the sprite attribute table 31 or the background attribute table in the VRAM 7 is designated by the address unit 21 so that the sprite generator 32 or the character generator in the VRAM 7 is accessed in accordance with a pattern number, a display position (X, Y), a color code etc. of a sprite and a character code etc. of a background. Data read from the sprite generator or the character generator thus accessed are stored in the sprite shift register 24 or the background shift register 25. These data of the sprite or background shift register 24 or 25 are supplied through the priority circuit 28 to the video color encoder 3. At this stage, pattern signals of a sprite or a character are passed through the terminals VD0 to VD3, and color codes are passed through the terminals VD4 to VD7. The terminals SP BG is high when a sprite information is passed through these terminals, and low when a background information is passed therethrough. The priority circuit 28 gives a priority to one of a sprite and a background in accordance with a bit SP/BG of a sprite attribute table. The video color encoder 3 which is supplied with the pattern signals produces RGB analog signals or video color signals.

Further, an apparatus for controlling the access of a video memory in a fourth embodiment according to the invention will be explained.

At first, the register number "OF" of the DMA control register 3Q is written into the address register 3A. It is assumed that a control mode in which bit 2 of SI/D and bit 3 of DI/D are "0" respectively is set in the DMA control register 3Q. Next, the register number "10" of the DMA source address register 3R is written into the address register 3A thereby writing a starting address of a source address in a DMA transfer into the DMA source address register 3A, and the register number "11" of the DMA destination address register 3S is written into the address register 3A thereby writing a starting address of a destination address in the DMA transfer. In addition, the register number "12" of the DMA block length register 3T is written into the address register 3A thereby writing a block length of the DMA transfer into the DMA block length register 3T. At this time, if an interface of the CPU 2 is of a sixteen bit data bus width, a lower byte and an upper byte of the block length are written thereinto simultaneously. This is trigger for the commencement of a DMA transfer so that data are transferred directly from the source address of the VRAM 7 to the destination address thereof. On the other hand, if an interface of the CPU 2 is of an eight bit data bus width, a lower byte of the block length is firstly written into the DMA block length register, and an upper byte thereof is then written thereinto. The setting of the upper byte is a trigger for the commencement of the DMA transfer.

In the DMA transfer as described above, the source and destination addresses are incremented in the DMA source and destination address registers 3R and 3S by one in accordance with the content "0" of the bits 2 and 3 of the DMA control register 3Q. At the same time, a counting up or down is performed in a counter for counting the block length. When a counted value is equal to the block length, the DMA transfer is controlled to be finished.

Although the DMA transfer is explained to be performed between two regions of the VRAM 7, it may be performed between the VRAM 7 and the sprite attribute table buffer 23. In such a case, a starting address of a source address is defined in accordance with a content of the DMA VRAM-SATB source address register 3U.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. An apparatus for controlling a scanning type video display, comprising:

a video memory for storing image data; a group of registers for storing control data for accessing said video memory, said registers including (a) an address register for storing an address value corresponding to an address of a selected one of the remaining ones of said group of registers, and (b) a raster setting register for designating an interrupt raster number;

counter means for counting a current raster number of said video display;

comparator means for comparing said interrupt raster number of said raster setting register and said current raster number and, in response to said numbers being equal, generating a coincidence signal; and means for controlling said video display in response to said control data, including (a) means for storing in said address register an address value corresponding to said raster setting register whereby said raster setting register is selected from said groups of registers to store a raster number, (b) means for sequentially storing a set of raster numbers in said raster setting register whereby a raster number stored in said raster setting register is replaced by a next larger raster number in response to said coincidence signal and plural coincidence signals are generated sequentially in response to the renewal of said one of said plural raster numbers, and (c) means for dividing said video display into plural display regions in response to said plural coincidence signals whereby images are displayed on said plural display regions of said video display in response to said image data.

2. An apparatus for controlling the access of a video memory according to claim 1, wherein said group of said registers includes a register in which data for detecting a plurality of scanning rasters on a displaying screen are set so that an interruption signal is produced when each of said plurality of scanning rasters is detected.

3. An apparatus for controlling the access of a video memory according to claim 2, wherein said displaying screen is divided into a plurality of regions in accordance with said interruption signal thereby displaying images corresponding to different pages of said video memory.

4. An apparatus for controlling the access of a video memory according to claim 1, wherein said group of said registers includes a register in which data for incrementing or decrementing an address are set so that said video memory is accessed in accordance with said address determined by said data for incrementing or decrementing.

5. An apparatus for controlling the access of a video memory according to claim 1, wherein said means for controlling is of an eight bit data bus width and said video memory is of a sixteen bit data bus width, and an address for accessing said video memory is incremented or decremented by a predetermined address width when an upper byte of said image data is transferred subsequently to the transfer of a lower byte thereof.

6. An apparatus for controlling the access of a video memory according to claim 1, register in which data for a block length in a DMA transfer is set so that said DMA transfer is controlled to start when said data for said block length is set in said register.

7. An apparatus for controlling the access of a video memory according to claim 6, wherein said DMA transfer is controlled to start when an upper byte of said data for said block length is set in said register subsequently to the setting of a lower byte of said data for said block length therein.

8. An apparatus for controlling the access of a video memory according to claim 1, wherein said means for controlling produces a signal for changing a data bus width between an eight and sixteen bit bus widths so that said data bus width is of eight bits between said means and said video memory when said signal is "0", while said data bus width is of sixteen bits therebetween when said signal is "1".

9. An apparatus for controlling a video display in accordance with claim 1 wherein said display is divided into plural regions in accordance with plural ones of said coincidence signals thereby displaying images corresponding to respective pages of said video memory.

* * * * *